United States Patent Office

3,430,238
Patented Feb. 25, 1969

3,430,238
APPARATUS FOR PROVIDING AN ACCURATE VERTICAL REFERENCE IN A DOPPLER-INERTIAL NAVIGATION SYSTEM
Heinz Buell, Mount Kisco, and Jack Rubin, Brooklyn, N.Y., assignors to General Precision Systems Inc., a corporation of Delaware
Filed July 18, 1967, Ser. No. 654,272
U.S. Cl. 343—9
Int. Cl. G01s 9/48
9 Claims

ABSTRACT OF THE DISCLOSURE

Apparatus for providing an accurate vertical reference in a combined Doppler-inertial navigation system. A relatively crude two-axis directional gyroscope having its spin-axis normally aligned to the local vertical and its two output axes respectively aligned parallel to the pitch and roll axes of the vehicle provides verticality data for stabilizing the Doppler antenna in pitch and roll. A two-gimbal heading and inertial reference unit mounted atop the antenna generates north and east error signals representing the antenna platform deviations from the true horizontal. Heading information from the latter unit is utilized to convert these error signals into corresponding pitch and roll components which are subsequently compared with the antenna platform's synchro outputs. This results in pitch and roll error signals attributable only to the directional gyroscope vertical alignment error. The last mentioned signals may then be used as correction terms to torque the gyro and thereby maintain long-term spin axis alignment to the vertical. For first order corrections, the gyro error correction terms are directly subtracted from the gyro's synchro pickoff voltages and the resulting pitch and roll data fed to the auxiliary equipment aboard the aircraft.

*Brief description of the invention*

The present invention relates to self-contained airborne navigational systems, and in particular, to a system containing interconnected Doppler radar and inertial sensing means, respectively.

In such hybrid devices, commonly referred to in the art as Doppler-inertial navigational systems, the Doppler radar is usually arranged to transmit three or more beams of radiant energy from the vehicle at different angles and to receive a portion of the energy after reflection from the earth. Motion of the vehicle relative to the earth causes the frequency of the received energy to deviate from that of the transmitted energy, and by measuring and comparing the frequency shifts of the various beams, the ground speed and the drift angle of the vehicle can be determined. The nature of the reflection process causes the frequency of the returned signal to fluctuate rapidly and erratically this leading to large errors in the instantaneous indications of ground speed and drift angle. However, Doppler systems are capable of very high accuracy if the data be averaged over a period of, say, several minutes, and the accuracy does not deteriorate with the passage of time.

The inertial sensor on the other hand may comprise a gyroscopically stabilized horizontal platform on which are mounted two accelerometers so that they measure accelerations in orthogonal directions in the plane of the platform. The accelerations so measured can be integrated to obtain velocities which can in turn be resolved to determine ground speed and drift angle. The accuracy of such systems depends, among other things, upon the horizontality of the platform since the accelerometers cannot distinguish between accelerations caused by motion of the vehicle relative to the earth and the accelerations due to gravity. Even if the platform were originally erected to exact horizontality it would deviate therefrom after a time because of the inherent random drift of the gyroscopes used for stabilization. Inertial systems as above described thus have the disadvantage that their accuracy deteriorates rapidly with the passage of time although their instantaneous, or short-term accuracy, is excellent.

It is plain therefore that on an individual basis Doppler and inertial systems have complementary advantages, that is, the former has excellent long-term accuracy while the latter has excellent short-term accuracy. Stated another way, Doppler systems have good response to low frequency fluctuations of input data while inertial systems have good response to high frequency fluctuations of input data. One factor affecting the accuracy of both systems is the need for accurate knowledge of vertical direction. This knowledge is required of Doppler systems in order to determine the angular position of the transmitted beams while in the case of inertial systems there is a stringent requirement for knowledge of the vertical because the platform must be exactly horizontal if the accelerometers are not to interpret the acceleration of gravity as a horizontal acceleration.

It has been proposed in the past to combine Doppler and inertial components and it has been found that a composite system not only utilizes fully the advantages of each system but in addition yields greater accuracy in the cross-over region than can be obtained with either system alone. Examples of such combined Doppler-inertial systems are fully disclosed in U.S. Patents 2,914,763 and 3,028,592.

Prior art Doppler-inertial systems not only provide very accurate heading, velocity, and position data for navigation purposes, but also a very accurate indication of the vertical reference which latter information is often required for accurate operation of auxiliary equipment such as aerial cameras, terrain following systems, bombsights, fire control systems, and the like. The expressions "vertical reference" and "vertical reference data," as used in this specification, refer to the problem of determining very accurately the vertical direction passing through the system in question and the center of the earth. This direction may sometimes be referred to herein as the "local vertical." As will be described more fully below, the "local vertical" may be determined by maintaining a reference table perfectly horizontal with respect to the earth's curved surface. The "vertical reference data," or more correctly, the instantaneous deviations relative to the "local vertical" in terms of the aircraft's pitch and roll angles may then be measured by suitable inertia sensing means. This is accomplished, for example, in the Doppler-inertial navigation system described in copending application Ser. No. 654,502, filed July 19, 1967, and assigned to the assignee of the present case, wherein a redundant high performance two-gimbal inertial platform is provided for supplying such vertical reference data. And, although this system has been found to function quite satisfactorily it nevertheless can be improved by the substitution of a less complex vertical reference unit offering advantages in size and weight as well as cost and reliability without sacrificing overall system accuracies.

Briefly stated therefore, it is the primary object of the present invention to replace the extremely accurate inertial-quality "vertical reference unit" in the aforementioned system with a conventional relatively crude vertical gyro located near the main inertial platform or heading reference unit. The last mentioned is directly mounted atop the Doppler antenna such that its gimbal pick-offs continuously provide signals indicative of the antenna's deviation from true horizontal. This deviation or "vertical error" results from two sources, namely, errors in the vertical data supplied by the vertical gyro for stabilizing the antenna, and dynamic errors in the antenna's servos which orient the antenna in accordance with the vertical gyro's output. By subtracting the outputs of the antenna gimbal synchro pickoffs from the verticality error outputs of the main inertial platform, the two error components may be separated and the result is a measure of the vertical gyro error. This error signal is subsequently converted into a correction term which in turn is fed back to the vertical gyro for improving the latter's accuracy. As a result, the outputs of the vertical gyro's synchro pickoffs provide accurate, steady-state vertical information in the form of the vehicle's pitch and roll angles which data may be then used to stabilize the Doppler antenna and as inputs to the vehicle's auxiliary equipment.

*Detailed description of the invention*

Figure 1:
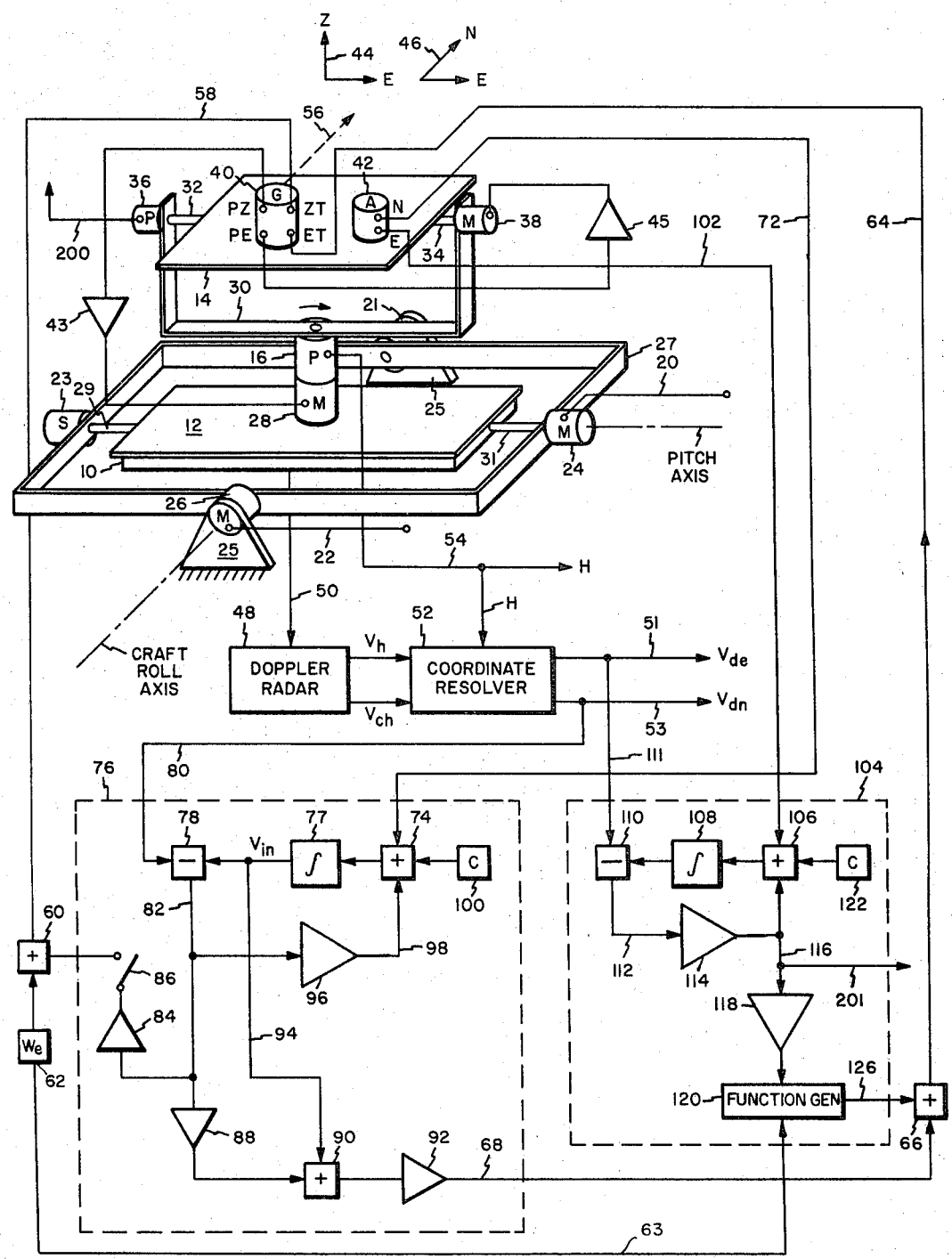
FIG. 1 is a schematic diagram partly in perspective and partly in block form showing a Doppler-inertial navigation system.

Referring more particularly to FIG. 1 of the drawings, there is shown a Doppler-interial navigation system wherein the Doppler radar antenna 10 is mounted upon a horizontally stabilized platform 12. A reference table 14 for the inertial guidance elements of the system is mounted by means of a two gimbal arrangement upon the antenna platform 12. The system, including the inertial elements mounted upon the inertial reference table 14, is effective to cause the table 14 to be continuously gyrocompassed in azimuth to maintain an alignment towards North, while the antenna platform 12 remains aligned with the longitudinal or roll axis of the aircraft. A pickup transducer 16 continuously measures the angle between platform 12 and table 14. The resultant signal therefore is an accurate measurement of the heading of the aircraft in relation to true North. The system also provides complete velocity data, as will be more fully described below.

The antenna platform 12 is maintained in a horizontally stabilized position by means of vertical reference signals which it may be assumed for the present are derived from an external source located elsewhere in the aircraft. These leveling signals are available through connections 20 and 22 to leveling servomotors 24 and 26.

Servomotors 24 and 26 together with gimbal ring 27 form parts of a two gimbal mounting structure for platform 12. The stator of motor 24 is rigidly fixed to ring 27 while its rotor is directly coupled to a platform input shaft 31 one end of which is journaled for rotation in ring 27 and the other end of which is rigidly fixed to platform 12. Similarly, the stator of motor 26 is rigidly fixed to the craft's airframe via stanchion 25 while its rotor is directly coupled to gimbal ring 27.

Conventional synchro receivers 21 and 23 are mounted in operative association with gimbal ring 27 opposite each servomotor as generally indicated. Synchro 21 has its stator rigidly fixed to a second stanchion 25 and has its rotor directly coupled to ring 27. Likewise, synchro 23 has its stator rigidly fixed to ring 27 and has its rotor directly coupled to platform output shaft 29 one end of which is rotatably journaled in ring 27 and the other end of which is rigidly fixed to platform 12. The common axis defined by servomotor 26 and synchro 21 is for all intents and purposes coincident with the roll axis of the craft while the same may be said of the relationship between the common axis defined by servomotor 24 and synchro 23 on the one hand and the craft's pitch axis on the other. By the above arrangement, the instantaneous position of platform 12 may be electrically compared in the synchro receivers with roll and pitch information derived from an external vertical reference means and such comparison utilized to derive appropriate error signals for energizing servomotors 24 and 26 as will be more fully explained below.

The mounting for the reference table 14 upon the antenna platform 12 includes an azimuth positioning motor 28, and the pickup device 16, the stators of which are fastened together mounted upon the antenna platform 12. The rotors of these elements are fastened together to a shaft which supports a gimbal ring 30. For additional stability, the gimbal ring 30 also has a pivotal connection at its upper end which is fixed with relation to the antenna platform 12. However, this upper end pivot connection and the upper portion of the gimbal ring 30 are omitted from the drawing for purposes of clarity. The motor 28 is normally caused to rotate the gimbal ring 30 in a plane generally perpendicular to the North direction.

Pivotally mounted upon the gimbal ring 30 there are coaxial shafts 32 and 34 which directly support the reference table 14. The shaft 32 may form the rotor shaft of an electromagnetic pickup device 36, the stator of which is rigidly mounted to the gimbal ring 30. The shaft 34 is the rotor shaft of a motor 38, the stator of which is rigidly connected to the gimbal ring 30. The mutual axis of shafts 32 and 34 is generally maintained in an East-West alignment (hereinafter referred to simply as the East axis), and the motor 38 is usually energized as needed to rotate the shaft 34 and the reference table 14 to maintain the table 14 horizontal with respect to the East axis, even though the antenna platform 12 may not be maintained perfectly horizontal. Hence, pickup 36 continuously provides electrical information representing the horizontal deviation of platform 12 about the East axis which information is made available on conductor 200 for use in other parts of the system as will be explained below.

Since no third gimbal is provided for the reference table 14, no final correction of the level of the reference table 14 for deviations about the North axis is available. It is one of the features of this invention that the need for physical North axis corrections is avoided by detecting the magnitude of the North axis leveling error and introducing electrical corrections for this error in lieu of physically correcting the position of the reference table 14. This simplification of the system does not interfere with the accuracy attainable by the navigation data system, and the system is capable of accurate "in-flight" gyrocompassing despite the simplification of the system described here.

The inertial sensing devices attached to and supported upon the reference table 14 include a two-axis, two degree of freedom, gyroscope 40, and a two-axis accelerometer 42. The gyroscope 40 is responsive to rotational displacements about a vertical axis, (sometimes also referred to herein as the azimuth or Z axis) and to rotational displacements about an East axis, as indicated symbolically by the vectors at 44. The accelerometer 42 is responsive to accelerations along the North axis, and to accelerations along the East axis, as symbolically illustrated by the vectors at 46. It will be understood that two gyros, each having a single degree of freedom, may be substituted for the single two-degree of freedom gyro 40, and two single-axis accelerometers may be substituted for the accelerometer 42.

The accelerometer 42 provides signals at output connections for North accelerations and East accelerations respectively indicated in the drawing as N and E. The use of these accelerometer signals in the system will be described more fully below. Similarly, the gyroscope 40 provides pickup output signals for rotational displacement errors about the azimuth axis and about the East axis respectively indicated at PZ and PE. Torquing input signals are applied to the gyro 40 for azimuth axis and Easterly axis rotations at the respective input terminals ZT and ET. The azimuth output signal is applied through an amplifier 43 to control the table azimuth positioning motor 28. The East axis gyroscope output signal is applied through an amplifier 45 to control the table East axis positioning motor 38.

The Doppler radar portion of the system is indicated schematically by the box at 48 connected at 50 to the antenna 10. This radar set may correspond to radar sets which have been used in prior systems. It may, for instance, employ three or more radar beams, with two beams aimed downwardly ahead of the aircraft on each side of it, and with one or two beams directed downwardly to the rear of the aircraft, on one or both sides. Comparison of the frequencies of the transmitted signals and the echo signals reflected back from the ground for the various beams provides an accurate indication of aircraft velocity and direction, particularly when averaged out over a period of time. For a more complete description of a Doppler radar set which is satisfactory for use in the present invention, reference is made to the disclosure contained in U.S. Patent 3,028,592, Parr et al., commonly assigned. The Doppler radar set 48 is capable of providing output signals which are an accurate indication of the velocity $V_h$ of the aircraft along the aircraft heading direction (i.e., along the aircraft's roll axis) and of the velocity $V_{ch}$ indicative of the component of aircraft velocity in the cross-heading direction (i.e., parallel to a direction along the aircraft's pitch axis). The radar system is also capable of providing other important information, such as vertical velocity of the aircraft, which is not necessarily pertinent to the description of the present invention, and which consequently will not be further dealt with here.

The heading and the cross-heading velocity signals from the Doppler radar 48 are connected to a coordinate resolver apparatus 52 which is operable to convert the heading and cross-heading velocity information into North and East velocity information $V_{dn}$ and $V_{de}$ (Doppler-North, and Doppler-East velocities) respectively as indicated at connections 53 and 51. In order to accomplish this, the coordinate resolver 52 must also be provided with an accurate heading signal H indicated at 54, from the heading pickoff 16. It will be recalled that this heading signal gives an indication of the angle between the aircraft heading the true North. The function of the coordinate resolver 52 may be carried out by a digital computer, and the digital computer may be one which is also used for other purposes in the aircraft.

The method of determining compass directions by gyrocompassing consists basically in sensing the earth's rotation about its North-South axis to thereby determine the direction of North (or South). Gyrocompassing is most easily performed from a position which is stationary with respect to the earth. However, accurate "in-flight" gyrocompassing may be accomplished with apparatus in accordance with the present invention.

The gyro 40 is oriented with its spin axis 56 pointed towards North, after the system has reached equilibrium. Because a gyro inherently maintains its attitude stabilized absolutely in space, in order to maintain the spin axis 56 of the gyro 40 pointing in a Northerly direction, the gyro must be "torqued" by an input signal on the azimuth axis to compensate for the continuous rotation of the earth, and to compensate for any East component of vehicle velocity, each of which tends to require that the spin axis of the gyro be turned in absolute orientation in order to continue to point North. These torquing correction signals about the azimuth axis are supplied through the torquing input connection ZT of the gyro 40 from a conductor 58. These signals are supplied from a suitable correction circuit 62 through an adding circuit 60. Similarly, the gyro 40 must be continuously torqued about its East axis by a function which is proportional to the North velocity of the craft in order to compensate for the North-South curvature of the earth, to keep the table 14 horizontal about the East axis. This correction is applied to the East torquing input ET of gyro 40 through a conductor 64, adding circuit 66, and conductor 68, from a gyrocompassing circuit 76. As previously mentioned, the table 14 is positioned about the azimuth and East axes in response to output signals at PZ and PE from the gyro 40 by means of the amplifiers 43 and 45 and positioning motors 28 and 38.

As long as the table 14 and the gyro 40 are aligned with the gyro axis 56 at true North, the East axis will be aligned to true East and the East input axis is therefore insensitive to East component velocities. Therefore, the regular North velocity compensation provided by circuit 76 is quite adequate for maintaining the table 14 level about the East axis without any requirement for correction on account of easterly velocities due either to the rotation of the earth or to easterly velocity of the vehicle with relation to the surface of the earth. However, if the table 14 is not perfectly aligned with axis 56 to the North, then the East axis will be out of alignment also, with the result that true East velocities appear to have a North-South component which is coupled into the disoriented East input axis of the gyro 40. This will include an apparent North component velocity due to the eastward rotation of the earth. None of these "apparent" North velocity components are compensated for by the regular North velocity compensation signals of circuit 76. The result is that the table 14 is no longer perfectly stabilized to a horizontal position about the East axis by the torquing signals applied through connection 64 to the ET terminal of gyro 40. Therefore, the continuance of an error in azimuth alignment of table 14 will cause an accumulation of error in leveling of the table 14 about the East axis. The deviation of the table from the horizontal position about the East axis results in a gravity signal on the North axis of the accelerometer 42.

The North axis accelerometer signal appears on the N terminal of the accelerometer and is supplied through connection 72 to an adding circuit 74 within the gyrocompassing circuit 76. The North axis accelerometer signal consists of a combination of an acceleration signal due to any acceleration in the northerly direction plus the North axis gravity signal due to any tilting of the table 14 about the East axis. The accelerometer signal received by adding circuit 74 is directed to an integrating circuit 77 to provide a signal equivalent to velocity. This may be referred to as an inertially determined North velocity $V_{in}$. The output $V_{in}$ from the integrator 76 is connected to a comparison circuit 78. Through connection 80, the North-Doppler velocity $V_{dn}$ is also provided to comparison circuit 78. By means of comparison circuit 78, the true North velocity as determined by the Doppler radar is subtracted from the combination of North velocity and integrated accelerometer gravity signal derived from the accelerometer 42 through the integrator 77. The difference which appears at the comparison circuit output connection 82 represents the integrated gravity signal only, and this is a measure of the tilt of the table 14 about the East axis. This error is amplified in an amplifier 84, and is supplied through a switch 86 (when the switch is closed) and the adding circuit 60 to torque the gyro about the azimuth axis to thereby re-align table 14 to re-aim the spin axis 56 of the gyro 40 to true North. The error signal at 82 is also supplied through a path including an amplifier 88, an adding box 90, and an amplifier 92 to the East torquing circuit including connection 68, adding box 66 and conductor 64. Thus, the error signal is caused to torque the gyro 40 about the East axis to re-establish the horizontal position of the table 14.

The so-called "regular" North velocity compensation from circuit 76 is proportional to North velocity expressed in terms of radians of rotation about the earth. This signal is supplied through the adding circuit 90 and the amplifier 92 by means of a connection 94 which carries the inertially determined North velocity signal $V_{in}$ to the adding circuit 90.

The error signal at connection 82 is also supplied through an amplifier 96 in a stabilizing feedback connection at 98 to the adding circuit 74 so as to maintain stable operation of the circuit. As is well known in the art of inertial guidance systems, the outputs of accelerometers must be corrected for "Coriolis" errors whenever they are operated in an earth-fixed coordinate system. An appropriate "Coriolis" correction is applied in the gyrocompassing circuit 76 by means of a Coriolis circuit schematically indicated at 100 feeding into the adding box 74.

When starting up the system, and commencing the gyrocompassing operation, the switch 86 in the azimuth correction circuit may be left open so that fast initial leveling about the East axis may be achieved. The switch 86 may then be closed and kept closed for the remainder of the operation of the system in order to provide automatic gyrocompassing as described above. The closure of switch 86 may be accomplished by an automatic time delay means (not shown).

The above description of the system assumes that the table 14 has been perfectly stabilized in a horizontal position with respect to the North axis. However, this condition does not exist because of the fact that the table 14 is mounted upon a two gimbal system which does not have a gimbal pivoted about the North axis. Accordingly, tilting of table 14 about the North axis is detected by the East accelerometer output, and the system is electrically compensated for such displacement. For this purpose, the East accelerometer output on terminal E of accelerometer 42 is supplied through a connection 102 to a North axis tilt compensating circuit 104. This circuit derives an electrical tilt correction signal which is supplied through the output connection 64.

Within the circuit 104, the East accelerometer signal from connection 102 is applied through an adding circuit 106 to an integrator 108 and thus to a comparison circuit 110. The East accelerometer output includes a combination of signals due to actual East axis accelerations of the craft plus a gravity term due to tilt of the table 14 about about the North axis. The comparison circuit 110 is connected at connection 111 to receive the Doppler East velocity signal $V_{de}$ from the resolver 52, and is operable to subtract the Doppler East velocity signal from the integrated signal received from the integrator 108. The difference signal at the output 112 of comparison circuit 110 represents the portion of the output of integrator 108 which is due to a gravity signal component from the East accelerometer and thus represents a term proportional to the tilt of table 14 about the North axis. Since table 14 has no gimbal permitting rotation about the North axis, this signal will also represent the tilt of platform 12 about the North axis. The error signal is then modified in the amplifier 114 and is fed back at connection 116 to the input adding circuit 106 for stabilizing the East velocity loop integrator 108. The tilt error signal at 116 is also passed through appropriate amplifiers 118 and 120 which further modify it to produce a fully corrected East gyro torquing function at connection 126; however, before this is done it is made available at conductor 201 for use in other parts of the system as will be explained below. Incidentially, the East accelerometer output before integration, is corrected for Coriolis by means of an appropriate circuit schematically indicated at 122 feeding into the adding box 106.

As mentioned, the tilt of table 14 and/or platform 12 away from the horizontal about the North axis causes an error in the East accelerometer signal. It also causes similar tilting of the East axis of gyro 40 away from the horizontal. Accordingly, the East axis of the gyro may be said to sense a vectorial component of input about the vertical or azimuth axis due to the rotation of the earth relative to the vehicle. With respect to this vertical component of its input, the gyro 40 requires an earth rate correction similar to the correction applied to the azimuth gyro input from the circuit 62 as previously described above. However, this is only a fractional correction proportional to the trigonometric "sine" function of the angle of displacement from the horizontal. This correction factor is generated within the circuit 120 and may be expressed as follows:

$$\left(W_e \sin L + \frac{V_e}{R} \tan L\right) \sin U_n$$

where:

$W_e$ = earth's rate of rotation
$L$ = latitude
$V_e$ = East velocity of the craft
$R$ = radius of the earth
$U_n$ = the angle of (tilt) about North axis.

The portion of the above expression within the parentheses represents the earth rate correction applied by circuit 62 to the azimuth torquing input of gyro 40. The circuit 120 may conveniently obtain this function by an interconnection with circuit 62 indicated generally by reference character 63.

The tilt correction factor from circuit 120 may be considered as only a first order correction. However, this correction is quite adequate in the preferred from of the invention in which the two gimbal supporting structure for table 14 is itself supported upon the antenna platform 12 because the antenna platform itself is very accurately stabilized at a level position by external signals supplied by a vertical reference means as will be more fully described below. Thus, the heading and inertial reference system which is disclosed in this specification and in the drawing of FIG. 1 including the feature of mounting table 14 upon the platform 12 is the preferred form. However, it is within the scope of the present invention to employ a two gimbal mounting for the inertial system reference table 14 in which the mounting is not necessarily supported upon a horizontally stabilized system. In such a situation, the correction signals derived from the circuit 104 to compensate for rotational displacements away from the horizontal about the North axis 46 may be anticipated to be greater. Therefore, in the latter case if a high degree of system accuracy is required, more elaborate correction signals of higher order may be necessary to compensate for such deviations from level.

In this connection, it will be appreciated that when the heading and inertial reference system is "body-mounted," that is, attached directly to the vehicle airframe instead of to a horizontally stabilized platform, the North and East axis deviation signals available on conductors 200 and 201 respectively will provide (after coordinate transformation through the heading angle H) extremely accurate vertical reference outputs in the form of signals representing the vehicle's instantaneous roll and pitch angles. The latter information may then be applied directly to such auxiliary equipment as mapping cameras, bomb sights, fire control system and the like, all of which require such data for accurate aiming and stabilization.

On the other hand, when the inertial table 14 is mounted on a stabilized platform as described in relation to the preferred embodiment of FIG. 1, the verticality outputs of the heading and inertial reference unit comprise extremely accurate error signals proportional to the deviation of the stabilized platform from the true horizontal. Hence, these error signals may be used to continuously improve the accuracy of an external vertical reference means originally supplying the platform stabilization data. Once this is accomplished, the roll and pitch information obtained from the external vertical reference source will be of sufficiently high accuracy for direct application to the auxiliary equipment.

Figure 2:
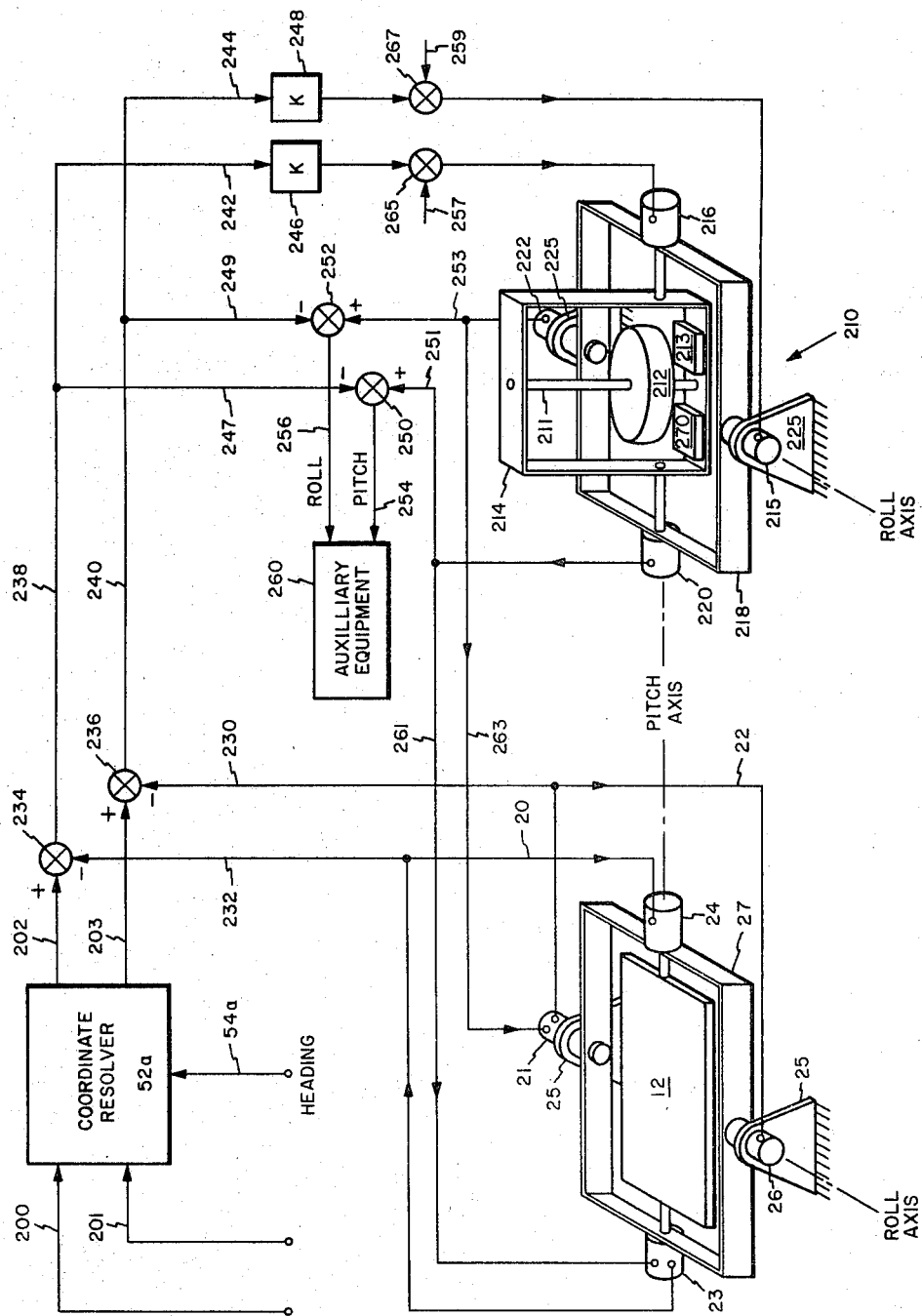
FIG. 2 is a circuit diagram partly in schematic and partly in block form showing the interconnections between the Doppler-inertial system of FIG. 1 and the novel vertical reference means according to the present invention.

Thus, referring now to FIG. 2, there is schematically shown an external vertical reference means 210 for continuously supplying horizontal stabilizing data to platform 12. Although omitted for the sake of clarity, it will be understood that the platform 12 supports the Doppler antenna 10, gimbal ring 30, and inertial platform 14 as described in connection with FIG. 1. Hence, the heading signal made available on line 54 (FIG. 1) is shown in FIG. 2 on line 54a. Likewise, the East axis deviation signal and the North axis deviation signal are provided respectively in FIG. 2 on lines 200 and 201. The verticality error signals on conductors 200 and 201 together with the heading signal on line 54a are applied as inputs to a coordinate resolver 52a which functions in a manner identical to that of resolver 52 (FIG. 1). That is, the signals on lines 200 and 201, which are measures of the levelness of platform 12 in a North-East coordinate system, have their coordinates rotated through the instantaneous heading angle of the craft. As a result, resolver 52a continuously yields outputs on lines 202 and 203 which are indicative of the instantaneous deviations of platform 12 from the true horizontal with reference to the craft's pitch and roll axes, respectively.

The vertical reference unit 210 in preferred form comprises a conventional low-cost directional gyroscope located near the heading and inertial reference unit. As schematically indicated, this gyroscope is of the two-degree of freedom displacement type having its spin axis normally aligned to the local vertical and each of its output axes respectively aligned parallel to the pitch and roll axes of the craft. In other words, the spin axle 211 of gyro wheel 212 is supported for vertical rotation on an inner gimbal 214 which, if free to rotate, would do so about the craft's pitch axis. Similarly, inner gimbal 214 is supported for rotation on an outer gimbal 218 which is free to rotate about the roll axis of the craft. The entire gimbal structure is appropriately fixed to the craft's airframe through a pair of stanchions 225 as indicated.

A conventional gravity sensitive leveling switch marked generally by reference character 213 is mounted on the inner gimbal (pitch) 214 for initial rapid erection of the wheel. The switches' outputs (not shown) are applied directly to a pair of gimbal torquing motors 215 and 216 for precessing the gyro wheel axis to the local vertical. Since the angular momentum of gyro wheel 212 is quite large and the gimbal bearings have very little friction, the torques generated by the pitch and roll motions of the aircraft will be quite sufficient to rotate the gimbals relative to the airframe accordingly. Thus ordinarily motions of the vehicle will not affect spin axis alignment to the vertical. However, inherent drift in the gyro and uncompensated angular rates due to vehicle motion around the earth will cause the spin axis to depart from the vertical and hence proper means must be supplied to continuously realign the gyro. Inasmuch as the level switch is used only for initial erection and is disabled thereafter, the above requirement is met by deriving vertically correction data from the heading and inertial reference unit for continuous excitation of gimbal torquers 215 and 216 during normal operation of the system. These correction terms are generated within the circuit shown in FIG. 2 in a manner to be more fully described below.

Intimately married to the gimbal structure of gyroscope 210 is a pair of conventional synchro transmitters 222 and 220. Synchro 220 has its stator rigidly fixed to outer gimbal 218 while its rotor or input shaft is directly coupled to inner gimbal 214 along a mutual axis including the output shaft of gimbal torquing motor 216. Similarly, synchro 222 has its stator rigidly fixed to airframe stanchion 225 and its input shaft directly coupled to outer gimbal 218 along a mutual axis including the output shaft of gimbal torquer 215. Hence, synchro 220 will sense the rotations of inner gimbal 214 resulting from pitch motions of the craft and synchro 222 will sense the rotations of outer gimbal 218 due directly to the rolling motions of the vehicle. The synchros will convert these motions into corresponding electrical signals and therefore a signal representing the instantaneous pitch angle of the aircraft will be imposed simultaneously on conductors 251 and 261, and a signal indicative of the instantaneous roll angle of the craft will appear simultaneously on lines 253 and 263.

Lines 261 and 263 are directly connected as shown to the synchro receivers 21 and 23 on the antenna platform gimbal structure. Each synchro receiver is, in turn, connected to a corresponding antenna platform servomotor to form a closed loop position-follow-up servomechanism. Hence, synchro receiver 23 compares the electrical pitch information on line 261 with the instantaneous pitch angle of platform 12, the latter represented by the position of shaft 29 (FIG. 1), and generates an error signal indicative of the difference therebetween. This position error or difference signal is then fed along conductor 20 to energize servomotor 24 which responds by rotating platform 12 in the direction necessary to achieve exact correspondence between the pitch angle of the craft as measured by synchro transmitter 220 and the pitch angle of platform 12 as measured by the synchro receiver 23. At such time, the error signal on line 20 will null to zero and platform 12 will be horizontally stabilized with respect to the pitch axis of the craft. In exactly the same fashion, synchro receiver 21 compares the electrical roll data on line 263 with the instantaneous roll angle of platform 12 and generates an error signal for application to servomotor 26 via conductor 22. The servomotor drives gimbal 27 until the latter's roll angle agrees with the roll angle measured by synchro transmitter 222 whereupon the error signal nulls to zero and platform 12 becomes horizontally stabilized in roll.

Ideally, then, gyroscope 210 comprises suitable vertical reference means for continuously supplying pitch and roll data sufficient to maintain platform 12 in a perfectly level position. And, if this were the case, the pitch and roll error signals appearing on lines 202 and 203 would be zero since, as it will be recalled, they are sensed originally by the heading and inertial reference unit mounted on platform 12 and they represent deviations of platform 12 from the true horizontal. Moreover, the outputs from synchros 220 and 222, inasmuch as they would represent perfectly accurate vertical reference informations in the form of the craft's pitch and roll angles, could be directly applied to the auxiliary equipment aboard the aircraft. Unfortunately, however, such a situation rarely occurs in practice owing to the fact that certain errors are inherently generated within the apparatus described above. This is, generally speaking, error signals will be present on lines 202 and 203 during normal operation of the system. These last-mentioned errors although accumulative in effect result from two sources, namely, alignment errors in the vertical reference signals supplied by vertical gyro 210 on lines 261 and 263 and dynamic errors in the antenna gimbal servos 24 and 26 which latter orient the platform 12 in response to the vertical reference signals. In order to minimize if not entirely eliminate these errors components they are first separated one from the other by feeding the output of the antenna platform's synchro receivers 21 and 23 via circuit path means 230 and 232 to summing points 234 and 236 respectively. There they are subtracted from the corresponding roll and pitch error outputs of resolver 52a. Since the synchro receiver outputs are direct measures of the "noise" or dynamic errors introduced by the corresponding servomotors 24 and 26 this results in the appearance of difference signals on lines 238 and 240 representative of only the vertical gyro alignment errors in roll and pitch respectively. The signals available on conductors 238 and 240 can thus be used as vertical gyro correction terms and accordingly are applied to summing points 250 and 252 via circuit path means 247 and 249, respectively. There they are algebraically compared with the output signals of the vertical gyro's synchros 220 and 222 supplied along connections 251 and 253 as shown. Inasmuch as the last mentioned synchro outputs comprise measurements of the aircraft's instantaneous roll and pitch angles plus the vertical gyro's alignment error in roll and pitch respectively, the difference signals which appear respectively on lines 254 and 256 at the outputs of summing points 250 and 252 will always comprise indications of only the aircraft's instantaneous roll and pitch angles. In other words, error signals representing the gyro's vertical alignment error are negatively fed back to the gyro for cancelling the error from the latter's output. The resulting extremely accurate pitch and roll information on lines 254 and 256 may therefore be applied directly to the auxiliary equipment in the aircraft as indicated generally by block 260.

It was mentioned previously that gyro 210 is a relatively inexpensive type which is another way of saying that it ordinarily has a rather high inherent random drift rate. And unless this drift rate is compensated for it will tend to increase the gyro's vertical alignment error with the passage of time. This, in turn, will increase the antenna platform's deviation for true horizontal thereby decreasing the accuracy of the deviation error signals produced on lines 200 and 201 by the heading and inertial reference unit (FIG. 1). The end result, of course, is that after a period of time the correction signals on lines 247 and 249 will contaminate rendering the pitch and roll informations on lines 256 and 254 virtually useless. Moreover, for proper operation of the Doppler radar (FIG. 1) it is extremely important that antenna 10 and therefore platform 12 be maintained in a horizontally stabilized condition. Thus, to insure long-term system accuracy, the verticality correction signals being fed to summing points 250 and 252 from lines 238 and 240 are simultaneously utilized as corrective gyro torquing signals. To this end, they are fed back around vertical gyro 210 through closed loops comprising conductors 242 and 244, gain adjustment means 246 and 248 and gimbal torquing motors 216 and 215, respectively. This arrangement results in a continuous precessing of the gyro's spin axis 211 sufficient to overcome the gyro's inherent random drift rate. In order to compensate for motion of the craft over the curved surface of the earth, additional earth rate and vehicle rate correction terms may be added to these torquing signals via summing points 265 and 267 as indicated generally by arrows 257 and 259. Suitable circuits for supplying such correction terms are well known in the art and need not be described herein.

Owing to the action of the feedback loops described above, the gyro's synchro outputs on lines 251 and 253 will, under equilibrium conditions, comprise extremely accurate indications of the aircraft's pitch and roll angles and furthermore will maintain this accuracy over the long-term. Hence, the vertical reference signals from gyro 210 will continuously and accurately energize the antenna's gimbal servos via the latter's synchro receivers to maintain platform 12 accurately stabilized in pitch and roll. Moreover any external disturbances tending to unbalance the system such as, for example, the random drift in the gyro will generate appropriate error signals on lines 200 and 201 tending to immediately restore the system to equilibrium.

In summarizing the operation of the system according to the present invention, the spin axis of the vertical gyro's wheel is rapidly and initially erected to the local vertical by the action of the leveling device 213 and the gyro's gimbal torquers 215 and 216. Since this is only a coarse adjustment, the signal outputs of the gyro's gimbal synchros 220 and 222 will reflect the aircraft's instantaneous roll and pitch angles as well as an error in the gyro's vertical alignment. Assuming for the present that the inertial platform 14 is inactivated, these contaminated roll and pitch signals will be repeated by the action of the antenna platform's synchros and gimbal servos, until a rough leveling of the antenna platform and therefore the head and inertial platform 14 is achieved. Although, at this point the platform 12 will momentarily come to rest at a position tilted away from the true horizontal by an amount equal to the sum of the errors in the vertical gyro's alignment and the errors in the antenna platform gimbal servos, the platform will be sufficiently level for commencing normal operation of the system. This is true because as mentioned previously the inertial platform and circuits associated therewith are capable of generating accurate verticality data as well as velocity and heading information despite the fact that the platform is slightly tilted away from true horizontal.

Thus when the heading and inertial reference system is subsequently activated it immediately senses the deviations of the antenna platform away from the horizontal and generates error signals accordingly. These error signals, after coordinate transformation in resolver 52a are immediately compared with the antenna platform's synchro output signals to separate out the vertical gyro's alignment error components in both pitch and roll. Since the latter now constitute suitable correction terms representing only the vertical gyro's alignment error they may be subtracted from the vertical gyro's synchro outputs to immediately yield open loop pitch and roll signals of high accuracy for utilization elsewhere in the aircraft. In addition, these same correction terms may be simultaneously fed beack around the gyro through a closed loop to begin a continuous precession of the latter's spin axis and thereby maintain the spin axis in steady state alignment to the local vertical despite the gyro's inherent random drift rate. In overcoming the gyro's tendency to gradually accumulate errors the action of the closed loop damps the vertical gyro's response, or stated in a slightly different manner, transforms the gyro into a filter or smoothing element insuring excellent long-term accuracy in the gyro's synchro outputs once the spin axis is erected to the vertical. The gyro's corrected pitch and roll outputs may now be utilized on a steady-state basis to continuously drive the antenna platform's gimbal servos in response to motions of the aircraft and the antenna platform will maintain a level position accurately determined by the vertical gyro's alignment with the local vertical.

Thus it will be appreciated that the vertical gyroscope not only produces accurate roll and pitch outputs for use by the auxiliary equipment, but in addition, provides accurate signals for dynamically slaving the antenna platform to the true horizontal which, in turn, serves to maintain the long-term accuracy of the North and East velocity loops in the heading and inertial reference unit at a maximum. However, perhaps the greatest advantage of the present invention is that a relatively crude conventional directional gyroscope having a high drift rate may be made as accurate as an inertial platform without resorting to the expense of a redundant inertial-quality platform to accomplish the same result.

Moreover, as it will occur to those skilled in the art, the inner gimbal 214 of the vertical gyro now constitutes an accurately aligned platform with respect to the local vertical and therefore may serve as a support for a vertical accelerometer mounted thereon as indicated generally; for example, by block 270. Such vertical accelerometer means when augmented by the addition of suitable integrating circuits will thus be capable of providing still another useful output, say, vertical velocity, from the system described hereinabove.

While specific means have been disclosed herein for carrying out the principles of the present invention this was done only by way of illustrating a preferred embodiment thereof. Obviously, many additional modifications within the spirit of the invention will occur to those skilled in the art, and it is therefore desired that the present invention be limited only by the true scope of the appended claims.

What is claimed is:
1. Vehicle navigational apparatus comprising,
   vertical reference means for generating plural signals representing the vehicle's angular deviations relative to a true horizontal with respect to the earth's surface, platform means adapted to be maintained in a position defined by said true horizontal in response to said plural signals, said platform means serving as a support for a Doppler radar antenna means, sensing means for deriving error signals indicative of said platform means' angular deviations from said true horizontal, and feedback means for applying said derived error signals to said vertical reference means for continuous correction thereof.

2. Apparatus in accordance with claim 1 wherein said vertical reference means comprises directional gyroscope means and said derived error signals comprise corrective torquing signals for continuous processing of said gyroscope means to thereby maintain the latter's spin axis accurately aligned with respect to a direction normal to the plane of said true horizontal.

3. Apparatus in accordance with claim 2 wherein said gyroscope means is adapted to generate said plural signals in response to rotation of said vehicle about its pitch and roll axis respectively.

4. Apparatus in accordance with claim 3 wherein, said normally horizontal platform means includes positioning means for selectively rotating said platform means about each of two mutually perpendicular axis in response to said plural signals, said axes substantially coinciding with the vehicle's pitch and roll axes respecitvely whereby said derived error signals are proportional to said platform means' instantaneous deviations from said true horizontal about said pitch and roll axis, respectively.

5. Apparatus in accordance with claim 4 wherein said derived pitch and roll error signals each comprise a component due to errors generated by said positioning means and a component due to errors in alignment of said gyroscope means spin-axis, said apparatus further comprising, means for removing said components due to errors generated by said positioning means from said pitch and roll error signals respectively, thereby producing signals proportional only to said gyroscope means spin-axis alignment error, and means for continuously algebraically substracting said last mentioned signals from corresponding ones of said plural signals generated by said gyroscope means to produce accurate signals indicative of the vehicle's instantaneous pitch and roll angles.

6. Apparatus in accordance with claim 2 further comprising, means for adding earth rate and vehicle rate correction signals to said corrective torquing signals.

7. Apparatus in accordance with claim 2 wherein said gyroscope means provides a support for accelerometer means mounted thereon whereby vehicle accelerations in the vertical direction may be measured by said accelerometer means.

8. Apparatus in accordance with claim 1 wherein said platform means serves as a support means for said sensing means.

9. Apparatus in accordance with claim 8 wherein said sensing means comprises a gimbal mounted table, gyroscopic means mounted upon said table and connected to control the attitude of said table about azimuth and East axes, respectively, inertial means mounted upon said table for generating a signal in response to accelerations along a North axis, a Doppler radar means operable for determining North velocity of the vehicle in terms of a Doppler North velocity signal, a gyrocompassing circuit connected to receive said North axis acceleration signal and said Doppler North velocity signal and being operable for the in-flight gyrocompassing orientation of said platform in the North direction by supplying gyrocompassing correction signals for torquing said gyroscopic means to establish level alignment of said table about the East axis and North alignment of said table in azimuth, inertial means mounted upon said table for generating an East axis acceleration signal, a North axis level compensating circuit connected and arranged to receive and integrate said East axis acceleration signal, said Doppler radar means being operable for generating a Doppler East velocity signal, said level compensating circuit including means for receiving and comparing the Doppler East velocity signal with the integrated East acceleration signal to derive an error signal to correct for gyroscope East axis earth rate functions which exist in the presence of tilting of said platform about said North axis.

References Cited

UNITED STATES PATENTS 3,068,706 12/1962 Lankow _____ 235—150.25 X
3,167,763 1/1965 Barkalow et al. _____ 343—9

RODNEY D. BENNETT, JR., *Primary Examiner.*

CHARLES L. WHITHAM, *Assistant Examiner.*

U.S. Cl. X.R.

235—150.25